April 15, 1952 P. SEREDNICKY ET AL 2,592,751
INERTIA BRAKE
Filed Oct. 22, 1949 2 SHEETS—SHEET 1
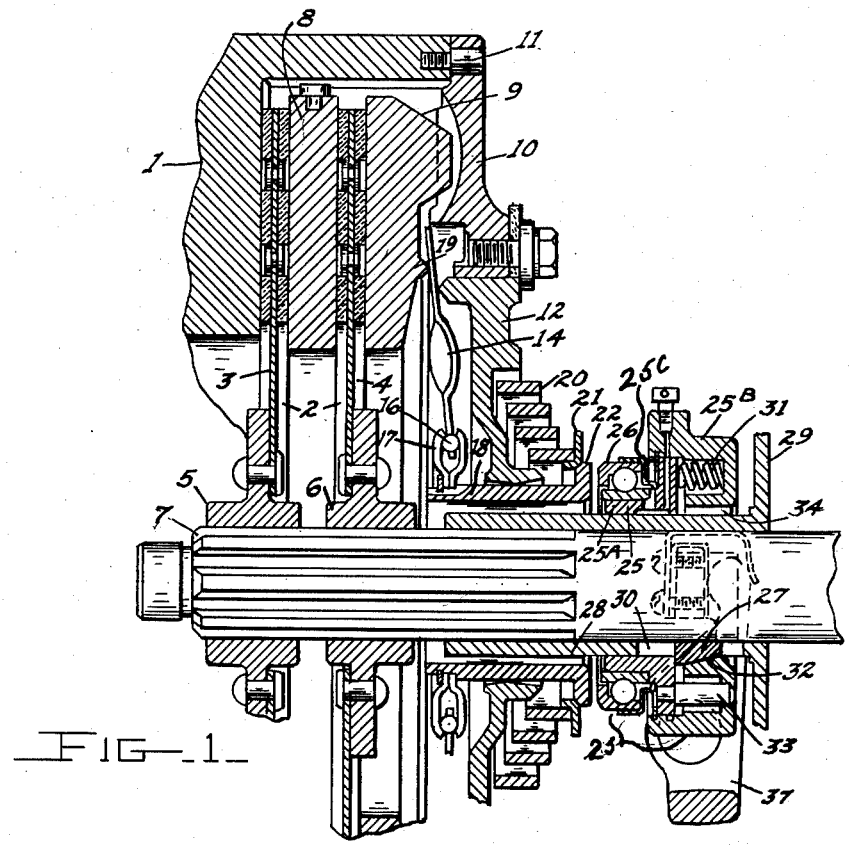
FIG-1
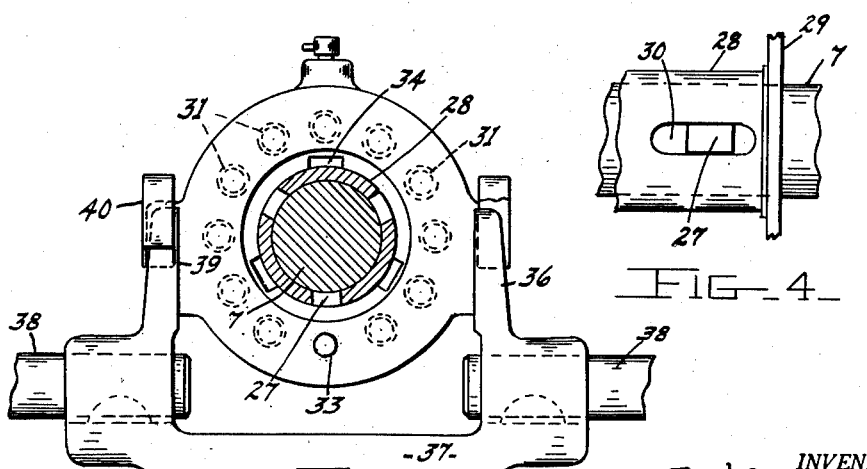
FIG-2
FIG-4
INVENTOR.
Paul Serednicky &
George J. Jarrett
BY Bodell & Thompson
ATTORNEYS April 15, 1952 P. SEREDNICKY ET AL 2,592,751
INERTIA BRAKE
Filed Oct. 22, 1949 2 SHEETS—SHEET 2

INVENTOR.
Paul Serednicky &
George J. Jarrett
BY Bodell & Thompson

ATTORNEYS

UNITED STATES PATENT OFFICE 2,592,751

INERTIA BRAKE

Paul Serednicky, North Syracuse, and George T. Jarrett, Syracuse, N. Y., assignors to Lipe-Rollway Corporation, Syracuse, N. Y., a corporation of New York Application October 22, 1949, Serial No. 123,054

7 Claims. (Cl. 192—12)

This invention relates to friction clutches of the type used in the automotive field, and has for its object an inertia brake operable during the throwing out or unclutching operation of the clutch to retard the rotation of the gears, shafts, clutches, etc., in the transmission line which tend to rotate under their momentum when the clutch is thrown out and thus delay or make difficult gear and clutch shifting operations.

The feature of this invention is an inertia brake built into the throw-out mechanism and particularly to brake shoes which operate on the clutch shaft successive to partial or full throwing out operation of the clutch by the clutch pedal.

The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view, partly broken away, of a clutch embodying this invention.

Figure 2 is an end elevation looking to the left in Figure 1.

Figure 3:
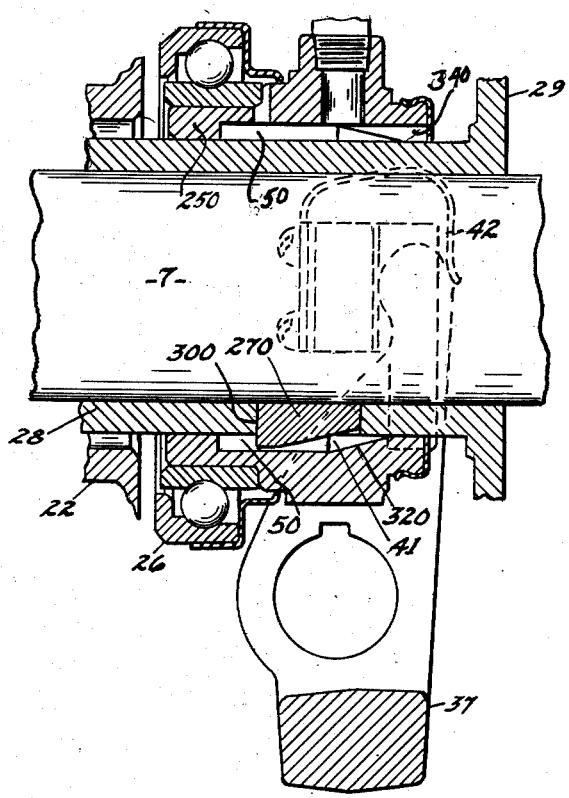
Figure 3 is a view similar to Figure 1, but with the clutch parts omitted, of a modified form of the invention.

The numeral 1 designates the driving element of the clutch which may be the flywheel of the engine, and 2 is the driven element as a whole, including members as friction plates or disks 3, 4, having their hubs 5, 6, slidably splined on a clutch shaft 7 to slide axially thereon. The driving element includes an intermediate pressure member 8 extending between the driven members or plates 3, 4, and an outer pressure member 9. The pressure members 8, 9, are connected to the flywheel to rotate therewith in the usual manner. The members 8, 9, and the driven plates 3, 4, are also axially shiftable. The driven plates or disks 3, 4, are provided with friction faces on opposite sides thereof for coacting with a friction face on the flywheel and on the pressure plate 9, and with opposite sides of the intermediate friction member or pressure plate 8.

10 designates the back plate of the clutch bolted at its rim to the flywheel, as at 11, and 12 designates a fulcrum carrying plate mounted on the back plate in the plane thereof between the inner edge of the back plate and the clutch plate.

14 are motion transmitting and multiplying levers here shown as pivoted at their inner ends at 16 through an annular coupling 17 to an operating or throw-out sleeve 18 shiftable axially of the clutch shaft 7. They act to press against an annular fulcrum 19 on the outer pressure face of the plate 9. The clutch is engaged by a clutch spring acting through the fulcrum plate 12 and the throw-out sleeve 18, the spring here shown being a conical spring 20 thrusting at its end of larger diameter directly against the fulcrum plate, and at its other end against an abutment ring 21 which thrusts against an annular flange 22 on the throw-out sleeve 18. The clutch construction and the operating mechanism thus far described per se form no part of the invention and its construction, insofar as this invention is concerned, is immaterial.

The throw-out and brake mechanism comprises a nonrotatable, axially shiftable, throw-out member 25 supported concentric with the clutch shaft 7 and having a thrust bearing ring 26 rotatably mounted relatively to the member 26, the ring being shiftable against the flange 22 of the sleeve 18 to disengage the clutch, and friction shoes 27 in the bore of the member 25 and coacting with the clutch shaft 7, the brake shoes 27 being non-rotatable with the shaft or the throw-out member 25, the brake shoes 27 and the throw-out member having coacting cam faces to engage and shift the shoes against the shaft during axial shifting of the throw-out member to disengage the clutch.

As here shown, the throw-out member 25 is mounted on a tubular extension 28 of the bearing cap 29, which extension surrounds the clutch shaft 7 and the shoes 27 are located in slots 30 in the extension 28 and have a somewhat radial movement, and also in the form shown in Figure 1 a movement axially of the shaft 7. The bearing cap closes the bearing opening for the clutch shaft 7 in the wall of the transmission gear box.

In the form shown in Figure 1, the throw-out member 25 is divided into front and rear sections 25A and 25B. Compression springs 31 are interposed between the sections and are of such strength as to cause the sections to initially shift as a unit during the throwing out operation until the shifting out operation is retarded or restrained, so that the springs 31 compress whereupon the section 25B shifts towards the section 25A and brings a cam surface 32 on the section 25B tightly against a complemental surface on the brake shoes 27. The shoes 27 shift along the slots 30 until the section 25A is restrained and the springs 31 compress. The two sections 25A and 25B are held from separation under the action of the springs 31 by a retaining or snap ring 25C.

A suitable pin 33 holds the sections 25A and 25B from relative turning movement after the sections 25A and 25B and the springs 31 are assembled. For the purpose of assembling, the section 25B is formed with slots 34 opening into the bore thereof. After the sections are assembled, the section 25B is given a partial turn so that the slots 34 are out of line with the slots 30 in the extension 28, and the pin 33 lined up with its hole in the section 25B. The shoes 27 are located in the slots 30 and then the assembled sections 25A and 25B slid on the bearing cap extension 28 from the front end thereof.

The member 25 is actuated by arms 36 on a throw-out yoke 37 mounted on the operating or clutch pedal shaft 38, and these arms 36 coact at 39 with flat faces at diametrically opposite sides of the member 25B to hold the member 25B from turning. The yoke arms 36 also thrust against diametrically extending faces 40 at a right angle to the faces 39 during the shifting out operation. This construction is similar to that shown in pending application of Charles B. Spase, Sr. No. 54,989, filed October 16, 1948, now Patent No. 2,511,133, issued June 13, 1950.

In Figure 3, the throw-out member 250 is a single piece provided with an internal lengthwise chamber 50 in which the brake shoes 270 are located. However, the slots 300 in extension 28 are only long enough to permit radial action of the shoes 270 and the cam surface 320 on the throw-out member 250 is a conical wall on the chamber 50. The conical wall is normally spaced apart at 41 from the cam surfaces on the shoes providing a lost motion which must be taken up during the shifting out operation of the clutch before the brake shoes 270 are brought into braking contact with the shaft 7. The throw-out member 250 has slots 340 opening in the chamber corresponding to the slots 34, Figures 1 and 2.

The yoke arms are held against looseness or rattling relatively to the member 250 by a suitable spring construction designated 42.

In the operation of this mechanism, upon operation of the clutch pedal the clutch is first thrown out before the brake shoes are brought into braking engagement with the clutch shaft 7. In the construction of Figure 1, this operation is brought about by the throw-out member being formed with front and rear sections with the compression springs between them. In the construction shown in Figure 3, this operation is brought about by the lost motion at 41.

What we claim is:

1. A clutch throw-out and brake mechanism for clutches having a driven clutch shaft, said mechanism comprising a non-rotatable, axially shiftable, throw-out member enclosing said shaft and brake shoes pressing radially when operated against the shaft, the shoes being located within the throw-out member and supported to be held from orbital movement, the shoes and the throw-out member having coacting cam means to press the shoes radially inward at the end of the throw-out operation of the throw-out member.

2. A clutch throw-out and brake mechanism for clutch constructions having a driven clutch shaft extending through a fixed supporting sleeve, said mechanism comprising a non-rotatable, axially shiftable, throw-out member on the sleeve and shiftable axially thereon, and friction brake shoes located within the throw-out member and in radial slots in the sleeve to press when actuated radially against the shaft, the shoes and and the throw-out member having coacting cam means to press the shoes radially inward at the end of the throw-out operation of the throw-out member.

3. A clutch throw-out and brake mechanism for clutch constructions having a driven clutch shaft extending through a fixed supporting sleeve, said mechanism comprising a non-rotatable, axially shiftable, throw-out member on the sleeve and shiftable axially thereon, and friction brake shoes located in radial slots in the sleeve to press when actuated radially against the shaft, the shoes and the throw-out member having coacting cam means to press the shoes radially inward at the end of the throw-out operation of the throw-out member, said throw-out member comprising front and rear sections having relative axial movement and springs between the sections for normally holding the sections from relative axial movement during the throw-out operation until the clutch is disengaged and the axial shifting of the front section retarded, the cam means on the throw-out member being on the rear section.

4. A clutch throw-out and brake mechanism for clutch constructions having a driven clutch shaft extending through a fixed supporting sleeve, said mechanism comprising a non-rotatable, axially shiftable, throw-out member on the sleeve and shiftable axially thereon, and friction brake shoes located in radial slots in the sleeve to press when actuated radially against the shaft, the shoes and the throw-out member having coacting cam means to press the shoes radially inward at the end of the throw-out operation of the throw-out member, said cam means on the throw-out member being normally spaced in an axial direction from the cam means on the shoes.

5. A throw-out and brake mechanism for clutches of the type including generally driving and driven elements comprising axially shiftable friction clutch members, a clutch shaft on which the driven element is mounted, and spring means operable to compress and release said clutch members including a throw-out sleeve shiftable axially of the clutch shaft; said mechanism comprising a non-rotatable, axially shiftable, throw-out member supported concentric with the clutch shaft and having a bore surrounding the shaft and a thrust bearing ring rotatably mounted relatively to said member, the ring being shiftable against said sleeve to disengage the clutch, and friction brake shoes in the bore of said throw-out member and coacting with the clutch shaft, the brake shoes and said throw-out member having coacting cam faces to engage and shift the shoes against the shaft during axial shifting of said member to disengage the clutch.

6. A throw-out and brake mechanism for clutches of the type including generally driving and driven elements comprising axially shiftable friction clutch members, a clutch shaft on which the driven element is mounted, and spring means operable to compress and release said clutch members including a throw-out sleeve shiftable axially of the clutch shaft; said mechanism comprising a non-rotatable, axially shiftable, throw-out member supported concentric with the clutch shaft and having a bore, the wall of which is spaced from the clutch shaft, said member consisting of front and rear sections and compression springs between the sections and normally holding the sections from relative axial movement so that the sections initially shift axially as a unit, the front section having a thrust bearing ring rotatable relatively to said section and shiftable against said sleeve to disengage the clutch, and friction shoes held from rotation with the shaft and located in the bore of said throw-out member, the rear section and the shoes having coacting cam faces engaging during relative axial movement of the sections to compress the springs, and an operating lever acting on the rear section to shift said sections as a unit and the rear section relatively to the front section.

7. A throw-out brake mechanism for clutches of the type including generally driving and driven elements comprising axially shiftable friction clutch members, a clutch shaft on which the driven element is mounted, and spring means operable to compress and release said clutch members including a throw-out sleeve shiftable axially of the clutch shaft; said mechanism comprising a non-rotatable, axially shiftable throw-out member supported concentric with the clutch shaft and having a bore surrounding the shaft, and a thrust bearing ring rotatably mounted relatively to said member and shiftable against said sleeve to disengage the clutch, and friction brake shoes in the bore of said throw-out member and coacting with the clutch shaft, the brake shoes and said throw-out member having coacting cam faces to engage and shift the shoes against the shaft during the axial shifting of said throw-out member to disengage the clutch, the cam faces being normally spaced apart and coming into engagement when said throw-out member is shifted part way on its throw-out stroke.

PAUL SEREDNICKY.
GEORGE T. JARRETT.

REFERENCES CITED

The following references are of record in the file of this patent:

UNITED STATES PATENTS

| Number | Name | Date |
|---|---|---|
| 1,947,428 | Thomas | Feb. 13, 1934 |
| 2,040,034 | Tatter | May 5, 1936 |